United States Patent
Kiyko

(10) Patent No.: US 8,462,603 B2
(45) Date of Patent: Jun. 11, 2013

(54) DEVICE FOR RECORDING AND READING DATA ON A MULTI-LAYER OPTICAL DISC

(75) Inventor: Vadim Veniaminovich Kiyko, Moskovskaya obl. (RU)

(73) Assignee: Everhost Investments Limited, Nicosia (CY)

( * ) Notice: Subject to any disclaimer, the term of this patent is extended or adjusted under 35 U.S.C. 154(b) by 0 days.

(21) Appl. No.: 13/427,557

(22) Filed: Mar. 22, 2012

(65) Prior Publication Data

US 2012/0182853 A1    Jul. 19, 2012

Related U.S. Application Data

(63) Continuation of application No. PCT/RU2010/000509, filed on Sep. 9, 2010.

(30) Foreign Application Priority Data

Sep. 25, 2009 (RU) ................................ 2009136389

(51) Int. Cl.
G11B 7/135 (2012.01)

(52) U.S. Cl.
USPC ................. 369/112.23; 369/44.29; 369/53.28

(58) Field of Classification Search
USPC .................. 369/44.29, 53.28, 112.01, 112.23
See application file for complete search history.

(56) References Cited

U.S. PATENT DOCUMENTS

| | | | |
|---|---|---|---|
| 5,268,862 A | 12/1993 | Rentzepis | |
| 6,045,888 A * | 4/2000 | Chen et al. | 428/64.1 |
| 7,345,967 B2 * | 3/2008 | Hirai | 369/44.32 |
| 2004/0257962 A1 | 12/2004 | Walker et al. | |

FOREIGN PATENT DOCUMENTS

WO    2005/008637 A2    1/2005

OTHER PUBLICATIONS

Satoshi Kawata, et al., Three-Dimensional Optical Data Storage Using Photochromic Materials, Chem. Rev. 2000, 100, 1777-1788 (Apr. 25, 2000).
Yoshimasa Kawata, et al., Three-dimensional optical data storage using three-dimensional optics, Opt. Eng. 40(10) 2247-2254 (Oct. 2001).
International Search Report from correspondent International Application PCT/RU2010/000509 filed Sep. 9, 2010, mailed Jan. 20, 2011.
International Preliminary Report on Patentability with Written Opinion from correspondent International Application PCT/RU2010/000509 filed Sep. 9, 2010, mailed Mar. 27, 2012.

* cited by examiner

*Primary Examiner* — Wayne Young
*Assistant Examiner* — Brenda Bernardi
(74) *Attorney, Agent, or Firm* — Patentbar International PC

(57) ABSTRACT

A three-dimensional optical memory device comprises an optical disc positioning system, two sources of radiation with wavelengths $\lambda1$ and $\lambda2$, a focusing system, an illumination system, focusing system positioning means, a spectrum splitter, an optical sensor, and a control unit. The radiation source with wavelength $\lambda2$ is an array of laser diodes, which optical axes are parallel and lie in the same plane. The illumination system comprises: a cylindrical lens positioned so that the generatrix of its cylindrical surface is parallel to the plane of the p-n junctions of the laser diodes; a focusing lens; and a stabilizing circuit comprising a beam splitter situated between the focusing lens and the cylindrical lens, a second optical sensor optically coupled to the focusing lens via the beam splitter, and a stabilizer coupled to the focusing lens, wherein the stabilizer and the second optical sensor are electrically connected to the control unit.

4 Claims, 2 Drawing Sheets

DEVICE FOR RECORDING AND READING DATA ON A MULTI-LAYER OPTICAL DISC

RELATED APPLICATIONS

This Application is a Continuation application of International Application PCT/RU2010/000509 filed on Sep. 9, 2010, which in turn claims priority to Russian application No. RU2009136389 filed on Sep. 25, 2009, both of which are incorporated herein by reference in their entirety.

FIELD OF THE INVENTION

The invention relates to three-dimensional (3D) optical memory devices and, more specifically, to devices used for recording, erasing and reading data on a multilayer optical recording medium. The device as claimed in the invention may be used in all areas of computing that require recording large files of information on compact carriers. It is also may be used for recording and reading video data, for example, in independent video observation systems.

BACKGROUND OF THE INVENTION

Among the most important technical problems facing the designer of effective systems using laser radiation for recording information on 3D media, particularly on multilayer optical discs, is the one of positioning the laser beam in the recording area inside the 3D medium so that a change in the optical properties of the recording medium as a result of storage of information is spatially localized to the maximum. By a change in the optical properties in this case may be meant a change in the refraction index, absorption index, scattering coefficient or other optical, e.g. fluorescent, properties of the medium. The space occupied by recording one bit of data (pixel) must be minimized thus increasing the data recording density and volume for storage of data on one medium. The minimum lateral dimension of a pixel is limited to a value of about half the wavelength of the recording radiation. This directly follows from the diffraction theory and so is a fundamental physical limitation. By recording data with use of short-wave optical radiation and short-focus optical systems with large numerical apertures and corrected spherical aberration which focus this radiation within the recording medium one can obtain a high volume density of the recorded information.

Known in the art is a 3D device for recording and reading information (Kawata Y., Nakano M., Lee SC. Thee-dimensional optical data storage using three-dimensional optics.—Optical Engineering, vol.40 (10), p.2247-2254). The paper describes various (one-photon and two-photon) media and various versions of a device for recording, erasing and reading information, based on the principle of confocal microscopy. This device records information by focusing the radiation using the recording wavelength within the material and changing the refraction index of said material by exposing it to the radiation. The recorded data is then read out by registering the regions with the changed refraction index by the value of phase distortion of the reading light beam with a wavelength other than that of the recording radiation. The authors of the above paper point out the disadvantages of the proposed means and devices. The cross-talk between the layers is great where one-photon media are used, while the use of two-photon media requires a more powerful and shorter recording laser pulse, which makes the miniaturization of the laser source impossible. Besides, since the method of measurement of phase disturbances is highly sensitive, the data recording requires media with very high optical homogeneity of material and optical surface quality.

Also known in the art is a device for recording, erasing and reading the data within a photochromic material, typically spirbenzopyran, maintained in a 3D matrix, typically of polymer (U.S. Pat. No. 5,268,862. Three-dimensional optical memory, publ. Dec. 07, 1993). The device comprises laser radiation sources and systems for optical positioning and focusing of the laser beams. The material used for recording has two stable forms, spiropyran and merocyanine. Transition from the first form to the other is by two-photon absorption occurring on the wavelength of 532 nm. The recording medium is illuminated by two focused laser beams with the specified wavelengths in two mutually perpendicular directions. In this manner the spatial positioning of the area of interaction of two laser beams in a 3D space is achieved, while the conversion of the first form of the photochromic material into the other only occurs where the focal regions of the beams intersect. The other form of the photochromic material exhibits fluorescence when exposed to irradiation with light on a wavelength of 1064 nm As the material is irradiated, one can read the information by using the said fluorescence. The information recorded on a 3D material can be erased by heating the medium, total or local, say, by irradiating it with light having a wavelength of 2,12 μm. The disadvantages of this device are mostly analogous to those of the one described above. Inasmuch as the process of conversion of the recording material from one form to the other is a two-photon one, it is necessary to use radiation sources that possess a super-high peak capacity. The need for positioning the point of intersection of the focal regions of two orthogonal beams within a 3D body of the material limits the degree of decreasing the volume of recording one bit of information by the given device to units and tens of micrometers, while potentially the light beam can be focused onto an area with a lateral dimension of a split micron. Moreover, the degree of optical homogeneity of the medium and quality of the surfaces limiting the volume with the photochromic material must be very high. Where polymers are used as a binding matrix, obtaining the required optical quality under the conditions of serial production of 3D photochromic materials is quite problematic.

Also known in the art is device for recording/reading optical information on a multilayer recording medium (U.S. Pat. No. 7,345,967. Optical pickup unit. Publ. Mar. 18, 2008), comprising a source of radiation, a beam splitter, a controlled spherical aberration corrector and an objective lens as well as an optical sensor (photo receiver) optically coupled with the objective lens via the beam splitter, all arranged in series in the direction of the beam. The given device records and reads information by radiation on one wavelength. The operating modes of the device are selected by changing the power of the radiation aimed at the radiation recording medium. The main disadvantage of this device resides in an inevitable danger of losing the recorded information during readout. To mitigate it in the prior art device, it is suggested to decrease the radiation source power during information read-out down to the minimum permissible values at which the useful signal only slightly exceeds the noise level.

The problem of losing information during its read-out is particularly acute where materials with one-photon mechanisms of interaction of light with substance are used as the 3D recording media. In real light fluxes required for reading information using the changes in the optical density of the medium the information is erased within 5-10 reading cycles. To solve the given problem, some authors propose the method of reading information by using radiation on a wavelength located at the optical absorption edge of the photochromic material (see Satoshi Kawata, Yoshimasa Kawata. Three-dimensional optical data storage using photochromic materials. Chem. Rev. 2000, 100, 1777-1788). In this method, the volume of a pixel increases in real practice ten- or even hundred-fold. Besides, where one-photon media are used practically all authors also point out a slight crosstalk between the layers carrying the recorded information.

Therefore, the most justified option to choose in this case seems to be the one involving recording/erasing information using the threshold two-photon media in which information is recorded and erased only when a certain threshold intensity of light has been reached. However, such media require very high radiation power for reading and erasing information, while the practical embodiment of such power at present in miniaturized devices is impossible.

From the viewpoint of practical embodiment, the device closest by its technical nature and accepted by the authors as the prototype is the one used for reading/erasing information in 3D media, comprising two sources of radiation with different wavelengths, optically coupled with one focusing system having the means for controlling the position of the focusing region within the 3D medium, a spherical aberration correction unit and a receiver of optical radiation emitted by a 3D medium during read-out of the information recorded on it (U.S. Pat. No. 6,045,888. Optical volume memory, publ. Apr. 04, 2000). In this device, when information is recorded, a radiation having wavelength $\lambda 1$ is focused onto the recording medium consisting of alternating layers of transparent and photochromic materials. When exposed to said radiation, the photochromic material in the selected recording layer changes its optical properties and develops a capacity, when exposed to a radiation having wavelength $\lambda 2$, to fluoresce on wavelength $\lambda 3$. As the information is being read out, the radiation having wavelength $\lambda 2$ passes through the side surface and gets focused onto the recording medium, an acousto-optic deflector being used for addressing the signal layer. The fluorescent light emitted by the photochromic material on wavelength $\lambda 3$ within the limits of the pixels previously exposed to the light with wavelength $\lambda 1$ and containing bits of information is registered by the optical sensor. This system illustrates, more than any other, the technical nature of the claimed device and so is accepted by the authors as the prototype.

The main disadvantages of the prototype are the complex design and low accuracy of addressing during read-out. These disadvantages are determined by the presence in the optical layout of an acousto-optic deflector capable of changing the path of propagation of the read-out radiation with wavelength $\lambda 2$ and directing it onto the signal photochromic layer containing pixels of recorded bits of information. The prototype can, in principle, only ensure an acceptable accuracy of addressing when the multilayer recording medium is motionless. If the multilayer disc is rotating, which is absolutely essential for practical embodiment of the device, the uncontrollable axial and radial beats of the peripheral part of the disc will inevitably bring about worsening or even loss of the addressing accuracy.

SUMMARY OF THE INVENTION

The technical result to be achieved by this invention is to improve the addressing accuracy in reading information recorded on a multilayer optical disc.

In the claimed invention the said technical result is achieved by using a device for recording and reading information on a multilayer optical disc, comprising an optical disc positioning system, a source of radiation with wavelength $\lambda 1$, a focusing system which is arranged such that its optical axis is perpendicular to the flat surface of the multilayer optical disc, a source of radiation with wavelength $\lambda 2$, an illumination system arranged such that its optical axis is perpendicular to the optical axis of the focusing system, a focusing system positioning means, a spectrum splitter situated between a source of radiation with wavelength $\lambda 1$ and the focusing system, an optical sensor optically coupled with the focusing system via a spectrum splitter and a control unit electrically coupled with the source of radiation with wavelengths $\lambda 1$ and $\lambda 2$ and the optical sensor, the source of radiation with wavelength $\lambda 2$ designed as an array of laser diodes whose optical axes are parallel and lie in the same plane, whereas the illumination system comprises the components serially positioned along the optical axis, said components including a cylindrical lens arranged such that the generatrix of its cylindrical surface runs parallel to the plane in which the p-n junctions of the laser diodes are set, a focusing lens, and a stabilizing circuit comprising a beam splitter arranged between the focusing and cylindrical lenses, a second optical sensor optically coupled with the focusing lens via the beam splitter, and a stabilizer coupled with the focusing lens, said stabilizer and second optical sensor are electrically connected to the control unit.

Besides, the stabilizer may be designed as an electromagnetic suspension.

Besides, the second optical sensor may be designed as an array of light emitting diodes (LED).

Besides, the second optical sensor may be placed at an optical distance from the focusing lens, which distance is equal to the optical distance from the focusing lens to the cylindrical lens.

The essence of the invention resides in the following. The source of radiation with wavelength $\lambda 2$ represents an array of laser diodes with the number of the diodes being equal to that of the data layers of a multilayer optical disc. The illuminating system of the device comprises, as a minimum, two lenses: a cylindrical lens which is arranged such that it enables correction of divergence of the radiation in the direction perpendicular to the plane of the p-n junctions of the laser diodes, and a focusing lens which is arranged as that it enables obtaining the actual image of the exit aperture of the laser diode array on the side (cylindrical) surface of a multilayer optical disc. With all that, the magnification of the illumination system must be equal to the ratio of the spatial period of the data layers in a multilayer optical disc to the spatial period of the laser diodes in the array.

To aid in improving the addressing accuracy, it is suggested that the claimed device use an illumination system stabilizing circuit, comprising a beam splitter, a second optical sensor and a stabilizer. In this case, the addressing accuracy is improved due to the registration and analysis of the amplitude and/or spatial characteristics of the light beam of the source of radiation with wavelength $\lambda 2$, reflected from the side (cylindrical) surface of the multilayer optical disc. The signal registered by the second optical sensor enters the control unit whose output is electrically coupled with the stabilizer. The stabilizer is placed on the focusing lens, enabling it to make longitudinal and lateral linear displacements within fairly narrow limits as well as angular motions relative to the optical axis in the directions of displacements of the rotating multilayer optical disc which are caused by the axial and radial beats. As a result, a negative feedback is provided.

BRIEF DESCRIPTION OF THE DRAWINGS

The nature of the invention can be best illustrated by reference to the relevant drawings.

DETAILED DESCRIPTION OF THE PREFERRED EMBODIMENTS

Figure 1:
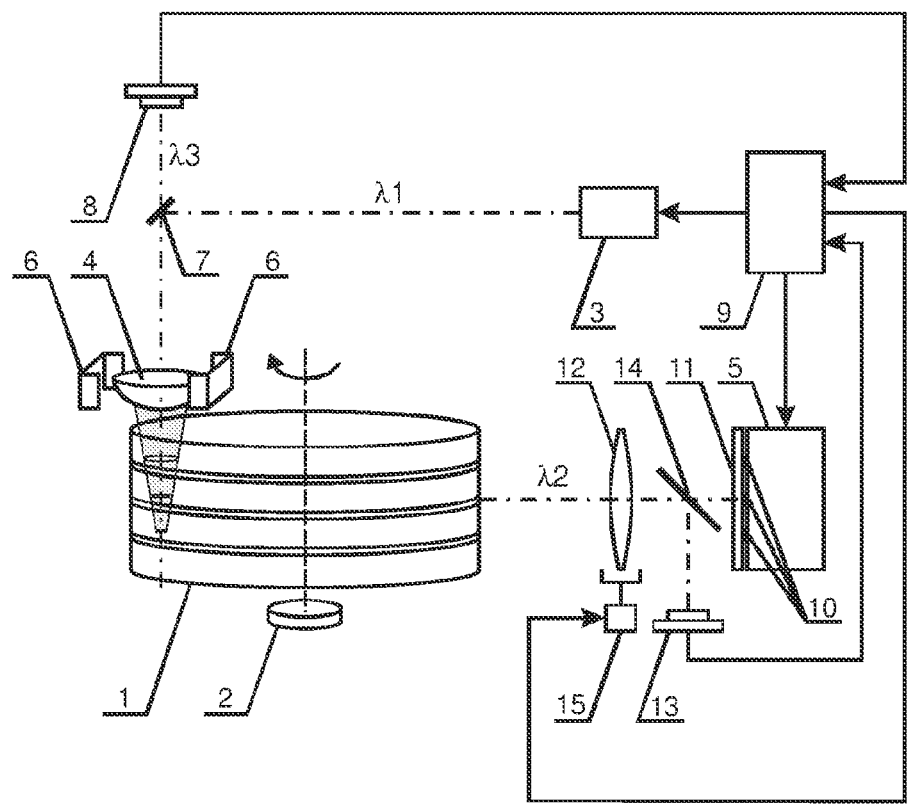
FIG. 1 is a diagram of the claimed device.

FIG. 1 shows multilayer optical disc 1, optical disc positioning system 2, source 3 of radiation with wavelength λ1, focusing system 4, source 5 of radiation with wavelength λ2, designed as an array of laser diodes 10, positioning means 6 of focusing system 4, spectrum splitter 7 capable of reflecting the radiation on wavelength λ1 and passing the radiation on wavelength λ3, optical sensor 8 designed to be capable of registering the radiation on wavelength λ3, control unit 9, an illumination system comprising cylindrical lens 11, focusing lens 12 and an illumination system stabilizing circuit comprising second optical sensor 13, beam splitter 14 and stabilizer 15.

Figure 2:
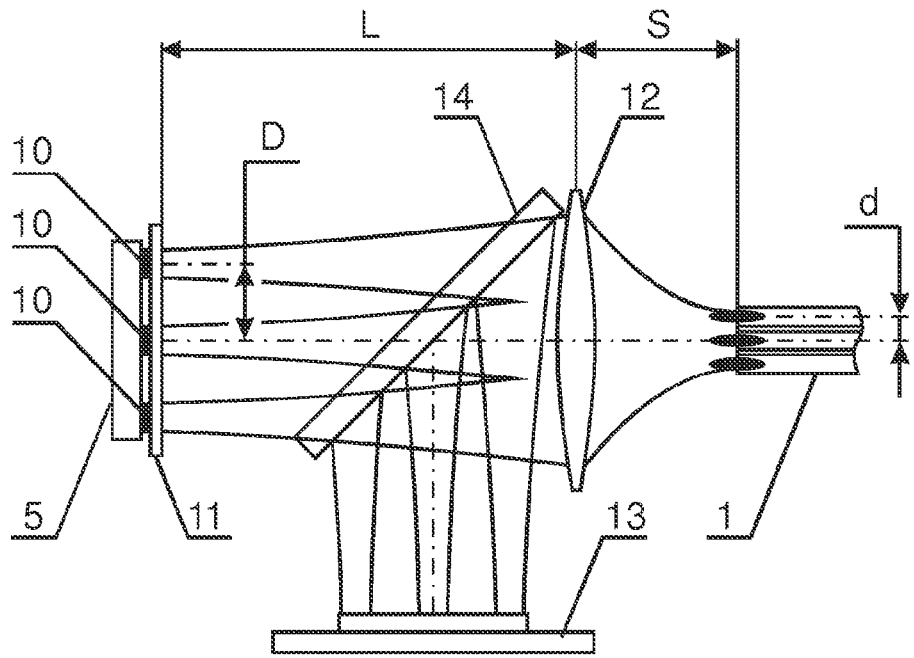
FIG. 2 shows an optical layout comprising a source of radiation with wavelength λ2, an illumination system and a detail of a sectional view of a multilayer optical disc.

FIG. 2 is a diagram of an optical layout of the illumination system, illustrating the mutual arrangement of its components. Focusing lens 12 is placed at distance L from cylindrical lens 11 whose output surface is essentially the output aperture of the array of laser diodes 10. Distance L meets the condition L>F where F is the focal distance of the focusing lens, which fact places the actual image of the subject within the image space. The distance between the focusing lens and side (cylindrical) surface of multilayer optical disc 1 is equal to S with S/L=d/D where d is a spatial period of data layers in multilayer optical disc 1, and D is a spatial period of laser diodes 10 in the array.

Figure 3:
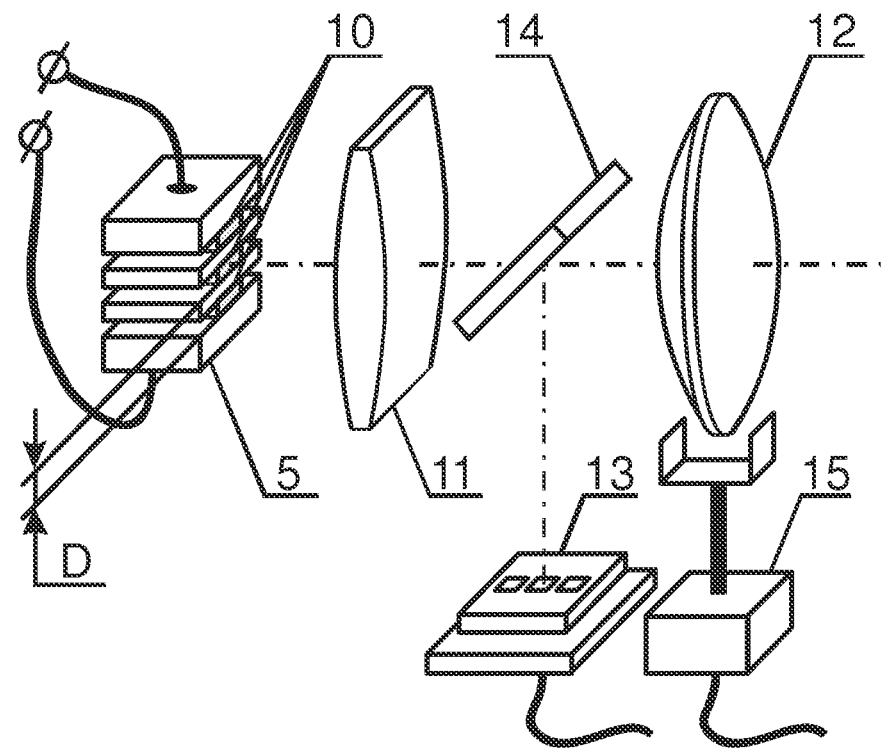
FIGS. 3 and 4 present exemplary embodiments of the illumination system with a stabilizing circuit and two different variants of arrangement of laser diodes within the array.
Figure 4:
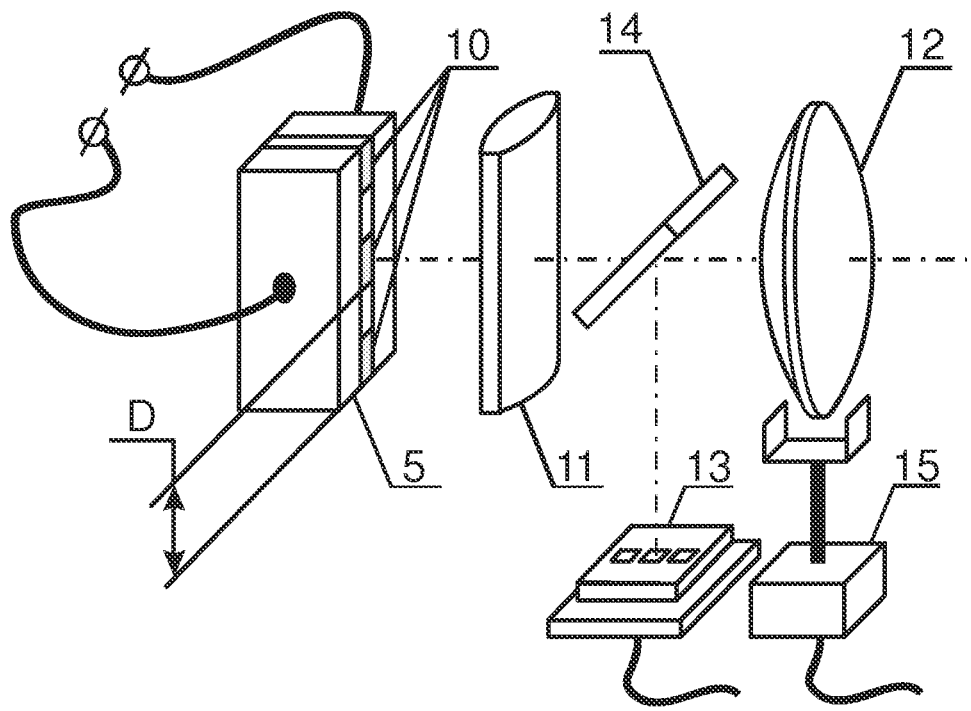

FIGS. 3, 4 show the variants of design of source 5 of radiation with wavelength λ2 and respective variants of arrangement of cylindrical lens 11 in an illumination system with a stabilizing circuit. Referring to FIG. 3, the arrangement of laser diodes 10 in the array is such that their p-n junctions lie in the same plane, while and in FIG. 4 they are shown as lying in parallel planes. In both variants of design, the generatrix of the cylindrical surface of cylindrical lens 11 runs parallel to the plane of arrangement of the p-n junction of any of laser diodes 10.

In an example of the best embodiment of the claimed device it is suggested to use multilayer optical disc 1 made up of alternating layers of a transparent material, say, polycarbonate, with a thickness of one individual layer of about 100 microns, and layers of a photochromic material, say, polycarbonate, comprising a photochromic fulgide complex, spirobenzopyran, having two stable forms, spiropyran and merocyanine, the thickness of individual layer being about 5 μm. A suggested source of radiation, 3, having two wavelengths, λ1 and λ2, is a solid-state laser based on crystal NdYVO4, with the radiation transformed into the third (λ1=0.355 μm) harmonic. As a source 5 of radiation with wavelength λ2, it is suggested to use an array of laser diodes 10 FSDL-556-001-200t (λ2=0.556 μm). It is preferable to have the number of laser diodes 10 in an array equal to the number of layers of photochromic material in a multilayer optical disc 1. A lens module with a large numerical aperture and means for monitoring and control of the spherical aberration is suggested to be used as focusing system 4. It is suggested that the means 6 for positioning focusing system 4 be designed as a controllable electromagnetic suspension enabling displacement of one or more optical components of focusing system 4 along the optical axis for selection of the signal photochromic layer of multilayer disc 1 to be used for recording or reading information. It would be also appropriate to make stabilizer 15 of the illumination system stabilizing circuit as a controllable electromagnetic suspension. It is suggested to use a dichroic mirror as spectrum splitter 7. It is also suggested that second optical sensor 13 be made in the form of a photodiode array to be placed at optical distance L from the focusing lens. The number of photodiodes in this array should be preferably equal to that of the layers of photochromic material in multilayer optical disc 1. With all that, each laser diode 10 of source 5 of radiation with wavelength λ2 will be optically coupled with each layer of photochromic material in multilayer optical disc and with each photodiode in the array of the second optical sensor 13.

Embodiment of the Invention

The device as claimed in the invention operates in the following manner. A multilayer optical disc, 1, is set, with use of positioning system 2, to a position as may be required for recording or reading information. In the recording mode, the radiation of source 3 having wavelength λ1 is directed via spectrum splitter 7 to focusing system 4 whose position is set by positioning means 6. Said means 6 enable positioning of the focusing regions of the light beam having wavelength λ1 inside multilayer optical disc 1 and adjustment of focusing system 4 for compensation of the spherical aberration. Information is recorded by changing the optical properties of the photochromic material in the photochromic layer selected for recording. The reading of the recorded information is performed by registering the fluorescence radiation having wavelength λ3, which is induced by the radiation with wavelength λ2, in the pixels of the photochromic material layer that have been pre-illuminated with a radiation having wavelength λ1. Some part of the fluorescence radiation emitted by these pixels enters the aperture of focusing system 4 whence it goes, via spectrum splitter 7, to the input of optical sensor 8. From the output of optical sensor 8, the signal goes to control unit 9 thus indicating that a bit of information has been successfully read out. In the reading mode, the radiation of source 5 having wavelength λ2 is directed, via cylindrical lens 11, beam splitter 14 and focusing lens 15, to the side (cylindrical) surface of multilayer optical disc. In this case, in the array of laser diodes only that source is activated whose position on the array corresponds to the position of the addressable photochromic layer on multilayer optical disc 1. The radiation having wavelength λ2 passes through the side surface inside the given photochromic layer and, spreading therein, reaches the area with the changed optical properties. Some radiation having wavelength λ2 gets reflected from the side surface of multilayer optical disc 1, enters the aperture of focusing lens 12 and passes through beam splitter 14 to the input of second optical sensor 13. From the output of second optical sensor 13, the signal goes to control unit 9 thus indicating that the reading beam has been successfully addressed. A change (e.g., decrease) in the amplitude of the signal from the output of second optical sensor 13, caused by uncontrollable displacements of multiple layer optical disc 1 during its positioning, is a control signal for activation of the illumination system stabilizing circuit. As it is activated, the signal from control unit 9 comes to stabilizer 1 which changes the position of focusing lens 12 in the direction of displacement of multilayer optical disc 1.

The claimed device is markedly more efficient than the prototype. This is due to the absence of the acousto-optic modulator in the optical train of the illumination system and reliable design of the reading beam addressing device which comprises a stabilizing circuit with negative feedback.

When assessing the importance of the invention for industrial application, the following factors should be pointed out: (a) the claimed device uses the layer-by-layer recording/reading principles already used in the existing DVD drives, so the embodiment of the invention requires no redesigning the existing drive system, only its upgrading. The positive effect is achieved by changing the monochromic radiation source to a source or a combination of sources using different wavelengths and adding an illumination system with a radiation stabilizing circuit. With all that, all the basic principles of design of the recording/reading control system remain unchanged, while manufacture of the claimed device, unlike its analogs, does not require precision technologies for fabrication of the medium.

What is claimed is:

1. A device for recording/reading information on a multilayer optical disc, comprising an optical disc positioning system, a source of radiation with wavelength $\lambda 1$, a focusing system arranged such that its optical axis is perpendicular to the flat surface of the multilayer optical disc, a source of radiation with wavelength $\lambda 2$, an illumination system arranged such that its optical axis is perpendicular to the optical axis of the focusing system, focusing system positioning means, a spectrum splitter located between the source of radiation with wavelength $\lambda 1$ and the focusing system, as well as a optical sensor optically coupled with the focusing system via the spectrum splitter, and a control unit electrically coupled with the sources of radiation with wavelengths $\lambda 1$ and $\lambda 2$, and the optical sensor, wherein the source of radiation with wavelength $\lambda 2$ is designed as an array of laser diodes whose optical axes are parallel and lie in the same plane, while the illumination system comprises components serially arranged along the optical axis, said components including a cylindrical lens which is arranged such that the generatrix of its cylindrical surface is parallel to the plane in which the p-n junctions of the laser diodes are located, a focusing lens and a stabilizing circuit comprising a beam splitter that is placed between the focusing lens and the cylindrical lens, a second optical sensor optically coupled with the focusing lens via the beam splitter, and a stabilizer coupled with the focusing lens, said stabilizer and second optical sensor being electrically connected to the control unit.

2. The device for recording/reading information on the multilayer optical disc of claim 1, wherein the stabilizer is designed in the form of an electromagnetic suspension.

3. The device for recording/reading information on the multilayer optical disc of claim 1, wherein the second optical sensor is designed in the form of an array of photodiodes.

4. The device for recording/reading information on the multilayer optical disc of claim 1, wherein the second optical sensor is placed at an optical distance from the focusing lens, said distance being equal to the optical distance from the focusing lens to the cylindrical lens.

* * * * *